(12) United States Patent
Bhowmik

(10) Patent No.: US 7,031,580 B2
(45) Date of Patent: Apr. 18, 2006

(54) RESTORING OPTICAL PULSES

(75) Inventor: Achintya K. Bhowmik, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 10/370,432

(22) Filed: Feb. 20, 2003

(65) Prior Publication Data

US 2004/0165848 A1 Aug. 26, 2004

(51) Int. Cl.
*G02B 6/00* (2006.01)
(52) U.S. Cl. .................................... 385/122
(58) Field of Classification Search ................ 385/3, 385/14–16, 121–126, 24, 122; 257/14; 359/176, 359/333, 325–332
See application file for complete search history.

(56) References Cited

U.S. PATENT DOCUMENTS

| | | | | |
|---|---|---|---|---|
| 4,637,725 A | | 1/1987 | Stefanov et al. | 356/354 |
| 4,787,714 A | | 11/1988 | Greene et al. | |
| 5,604,618 A | * | 2/1997 | Mori et al. | 398/150 |
| 5,619,368 A | * | 4/1997 | Swanson | 359/326 |
| 5,798,853 A | * | 8/1998 | Watanabe | 398/150 |
| 6,335,819 B1 | * | 1/2002 | Cho et al. | 359/333 |
| 6,507,680 B1 | | 1/2003 | Nishimura et al. | 385/14 |
| 6,674,930 B1 | * | 1/2004 | Hall et al. | 385/15 |
| 6,744,553 B1 | * | 6/2004 | Islam et al. | 359/326 |
| 2002/0079486 A1 | * | 6/2002 | Sarathy et al. | 257/14 |
| 2004/0001680 A1 | | 1/2004 | Bhowmik | |

OTHER PUBLICATIONS

Bhomwik et al, Self-phase modulation is polydiacentylene single crystal measured at 720-1064nm. Optic Letters, vol. 26, No. 12 Jun.1 15, 2001.*
Perrier, Philippe and Scott Thompson. Optical cross-connects: the newest element of the optical backbone network. Alcatel Telecommunications Review, 3rd Quarter 2000.
Bhowmik, Achintya K. and Mrinal Thakur. Self-phase modulation in polydiacentylene single crystal measured at 720-1064 nm. Optics Letters, vol. 26, No. 12. Jun. 15, 2001.
Bhowmik, Achintya K., Jianmin Wang and Mrinal Thakur. Second-harmonic generation in single-crystal thin films of 4-aminobenzophenone. Journal of Applied Physics, vol. 86, No. 2. Jul. 15, 1999.
Perrier, Philippe and Scott Thompson. Optical cross-connects: the newest element of the optical backbone network. http://www.alcatel.com.pl/download/pdf_tech/pwpo.pdf. Date Unknown.

* cited by examiner

*Primary Examiner*—Akm Enayet Ullah
(74) *Attorney, Agent, or Firm*—Trop, Pruner & Hu, P.C.

(57) ABSTRACT

In one embodiment of the present invention, a method includes introducing an optical signal into a first arm and a second arm of an optical device; self-phase modulating the optical signal propagating in the first arm; and outputting a high intensity portion of the optical signal spatially separated from a low intensity portion of the optical signal. In such manner, optical signals input into the optical device may be restored via cleaning and shaping.

30 Claims, 5 Drawing Sheets

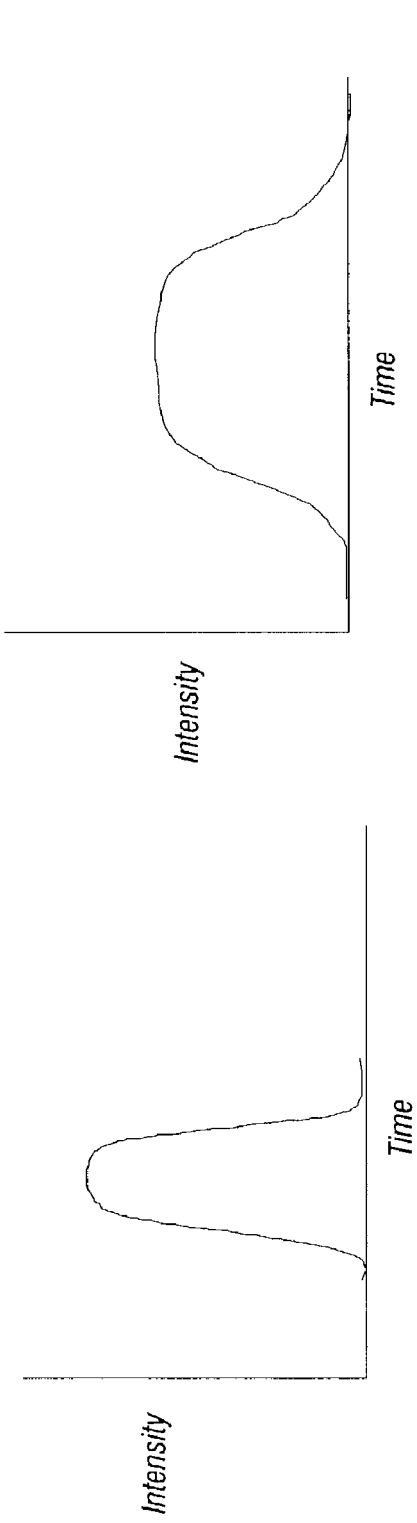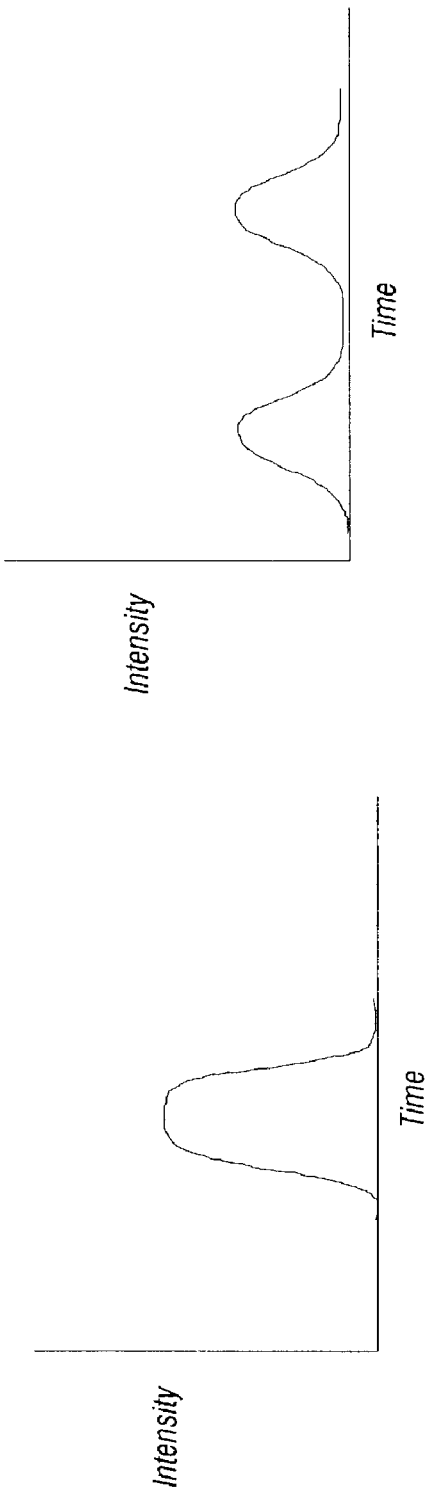

RESTORING OPTICAL PULSES

BACKGROUND

The present invention relates to optical communications and more specifically to the restoring of optical pulses to remove distortion.

In optical communication networks, optical pulses carrying information bits undergo distortion for several reasons. First, dispersion in an optical fiber causes the pulse to spread temporally. Second, non-uniform amplification in optical amplifiers creates wings and humps in the pulse. Third, optical components in a network may have irregular transfer functions. Pulses may also be distorted in other ways. Distortion such as unwanted low intensity wings, which are added to high intensity pulse streams, degrade performance of an optical system and limit either data transmission bit-rate or network link length.

Such distortion is undesired as typical optical pulse widths or durations in optical communication networks are extremely short. For example, in optical carrier (OC)-48 systems transmitting data at a rate of 2.5 Gigabits per second (GB/s), the pulse width is about 400 picoseconds (ps). In OC-192 systems (10 GB/s), the pulse width is about 100 ps, and in OC-768 systems (40 GB/s), the pulse width is about 25 ps. Thus, higher data rates require shorter optical pulses, which suffer greater degradation in the time domain due to dispersion.

Presently, repeaters are provided along a network that acts as transceivers to convert optical pulses to electrical signals, restore the pulses by cleaning undesired artifacts and reshaping, amplify, and then retransmit them as optical pulses. In a metropolitan network such repeaters may be placed every few hundred meters to several kilometers (km) apart, whereas in a long-haul network, such repeaters may be placed every few kilometers to tens of kilometers. However, such repeaters raise network costs and complexity and do not fully remove distortion from the optical signals. In a wavelength division multiplexed (WDM) network system employing multiple wavelength channels, such pulse regeneration becomes very expensive since the individual channels must first be spatially separated using a demultiplexer, pulses restored, and channels recombined using a multiplexer.

A need thus exists to remove unwanted distortion from optical pulses and restore optical pulses by cleaning and shaping them to remove such distortion without the above drawbacks.

BRIEF DESCRIPTION OF THE DRAWINGS

FIG. 2A is a graphical representation of a typical pulse shape emitted by an optical transmitter.

FIG. 2B is a graphical representation of a typical pulse shape distorted after propagating in an optical fiber.

FIG. 2C is a graphical representation of a restored optical pulse in accordance with one embodiment of the present invention.

FIG. 2D is a graphical representation of low intensity wings separated from a restored optical pulse in accordance with one embodiment of the present invention.

DETAILED DESCRIPTION

Figure 1A:
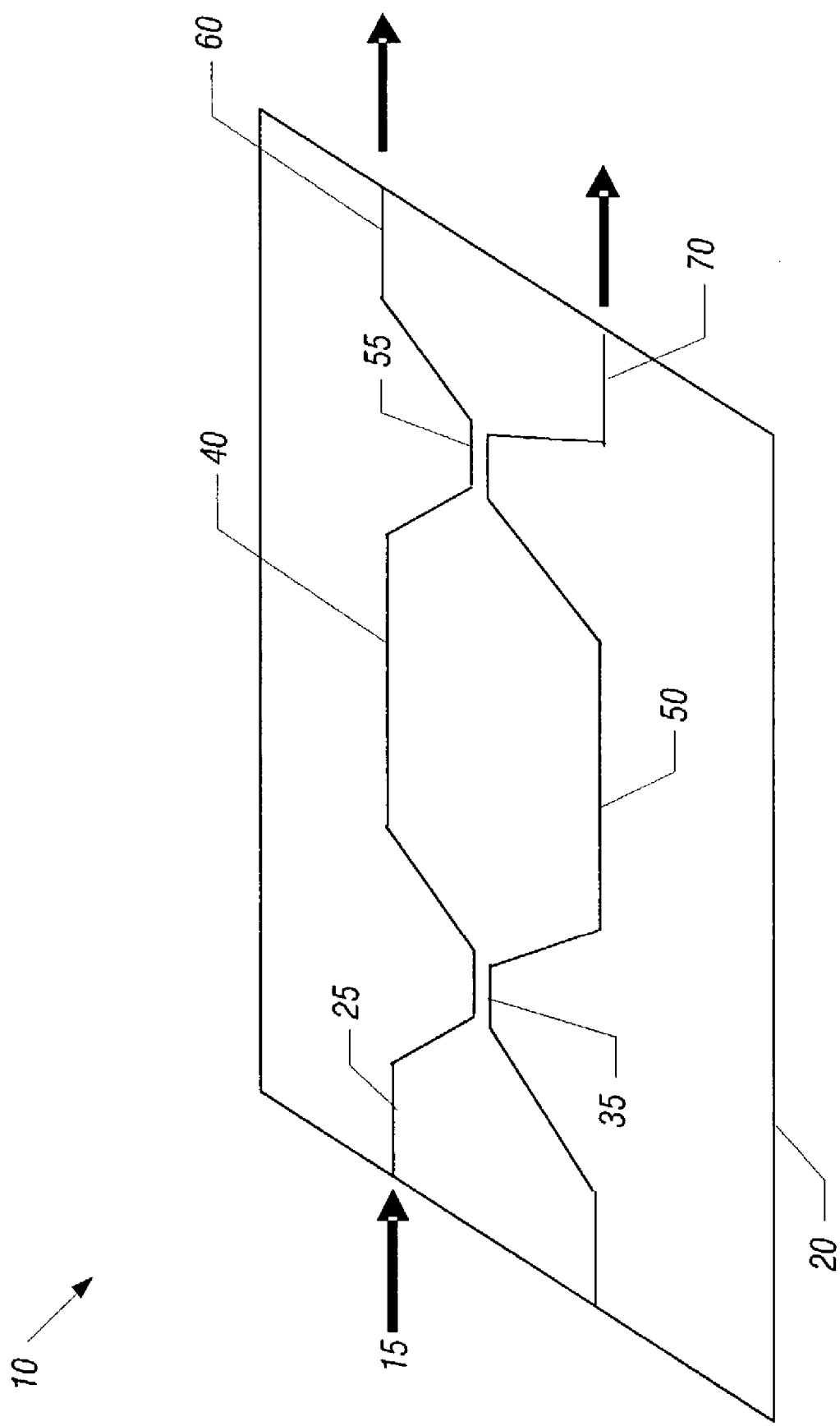
FIG. 1A is a schematic diagram of a planar integrated optical device in accordance with one embodiment of the present invention.

In one embodiment, the present invention includes an optical device that restores distorted optical pulses by cleaning and shaping them in the time domain. Referring now to FIG. 1A, shown is a schematic diagram of an optical device in accordance with one embodiment of the present invention. Optical device 10 may be based on a Mach-Zehnder interferometer (MZI) configuration, and may be a planar lightwave circuit (PLC) in one embodiment.

As shown in FIG. 1A, optical device 10 may be formed on a substrate 20, which may be for example silicon, crystals such as Lithium Niobate (LiNbO3), III-V semiconductors such as Indium Phosphide (InP) and Indium Gallium Arsenide (InGaAs), polymer materials such as polyimide, or another substrate material. Optical device 10 may include a first waveguide 25 which may receive incoming optical pulses, such as input pulse 15. The incoming optical pulse 15 may be equally split by a directional coupler 35, which in one embodiment may be a 3 dB coupler. A first arm 40 of the device 10 may be formed of a third order nonlinear optical (NLO) medium. Such an NLO medium may have a refractive index n according to the equation:

$$n = n_0 + n_2 I \quad [1]$$

where $n_0$ equals an intensity independent portion of the refractive index, $n_2$ is the nonlinear index, and $I$ is the instantaneous optical intensity.

In one embodiment, the NLO medium or material may have large hyperpolarizability. Such material, in one embodiment, may be polydiacetylene-para-toluene-sulfonate (PDA-PTS). Such material may be desirable as it has an exceptionally high nonlinear refractive index due to a one dimensional confinement of delocalized π-electrons in the polymer chain. Such PDA-PTS material may have a nonlinear index of approximately $10^{-5}$ centimeter$^2$ per Megawatt (cm$^2$/MW). Such a nonlinear index is approximately 5 orders of magnitude larger than that of silica. However, in other embodiments, NLO materials may have a larger or smaller nonlinear index. In other such embodiments, other polymers, such as poly-p-phenylene vinylene (PPV), polyacetylene, polythiophene, or poly-indenofluorene (PIF), may be used as the NLO material. In still other embodiments, III-V semiconductors such as Indium Phosphide (InP) or Indium Gallium Arsenide (InGaAs) may be used as the NLO material. In still other embodiments, a linear medium such as silica doped with a nonlinear medium or a combination of several nonlinear materials may be used.

In various embodiments, the optical pulse propagating through first arm (or "NLO arm") 40 may undergo self-phase modulation wherein the light-induced phase change due to the intensity-dependent refractive index of the NLO medium is given by the equation:

$$\Delta \phi = \frac{2\pi}{\lambda} n_2 I d \quad [2]$$

where $n_2$ is the nonlinear index, d is the length of the NLO arm 40, I is the instantaneous optical intensity and λ is the wavelength. In various embodiments, the length of first arm 40 may be between approximately one to twenty centimeters (cm). The length of the nonlinear arm for a particular material system and application may depend on the magnitude of the nonlinear index of the material and optical intensity used in the application.

In certain embodiments, the parameters of NLO arm 40 may be designed so that a central high-intensity portion of the optical pulse undergoes self-induced π phase retardation. The second portion of the optical pulse separated by directional coupler 35 travels through a second arm 50. This second arm 50 may be made of silica, in one embodiment. As shown in FIG. 1A, the two portions of the optical pulse may be recombined at a second directional coupler 55, which in one embodiment may be a 3 db coupler.

After such recombining, a high intensity main portion of the pulse may exit device 10 via a first waveguide 60, while low intensity wings of the pulse may exit device 10 via a second waveguide 70. It is to be understood that in various embodiments, the low intensity wings may be undesired and not used further. In such manner, the principal portion of the pulse may be spatially separated from the undesired wings without requiring any external electrical power.

While described above as a symmetric MZI structure, in other embodiments, a device in accordance with the present invention may be formed of an asymmetric MZI structure. In a conventional asymmetric MZI structure, the two arms of the device may have a π phase difference. Thus, in an embodiment of FIG. 1A using an asymmetric MZI structure, the high intensity main portion of the pulse may exit device 10 via second waveguide 70 and the low intensity wings may exit via first waveguide 60. In other words, in an asymmetric configuration, the high and low intensity portions may exit from the opposite waveguide than they would in a symmetric configuration.

In other embodiments, a device in accordance with the present invention may be formed using a push-pull MZI structure. In such a push-pull configuration, both arms of the device may alter the phase of an incoming signal by a phase of $$\frac{\pi}{2}.$$

Accordingly, the resulting phase difference of the two arms may be a π phase difference. Thus in an embodiment of the present invention using such a push-pull MZI configuration, one arm may be composed of a positive nonlinear material and a second arm may be composed of a negative nonlinear material. Thus the combination of the two arms may provide a phase difference of π. Use of such a push-pull configuration may be desirable in certain embodiments to reduce the length of first and second arms. In embodiments in which the arms have positive and negative $$\frac{\pi}{2}$$

phase shifts, the arms may have a length of between approximately 0.5 cm to 10 cm.

Figure 1B:
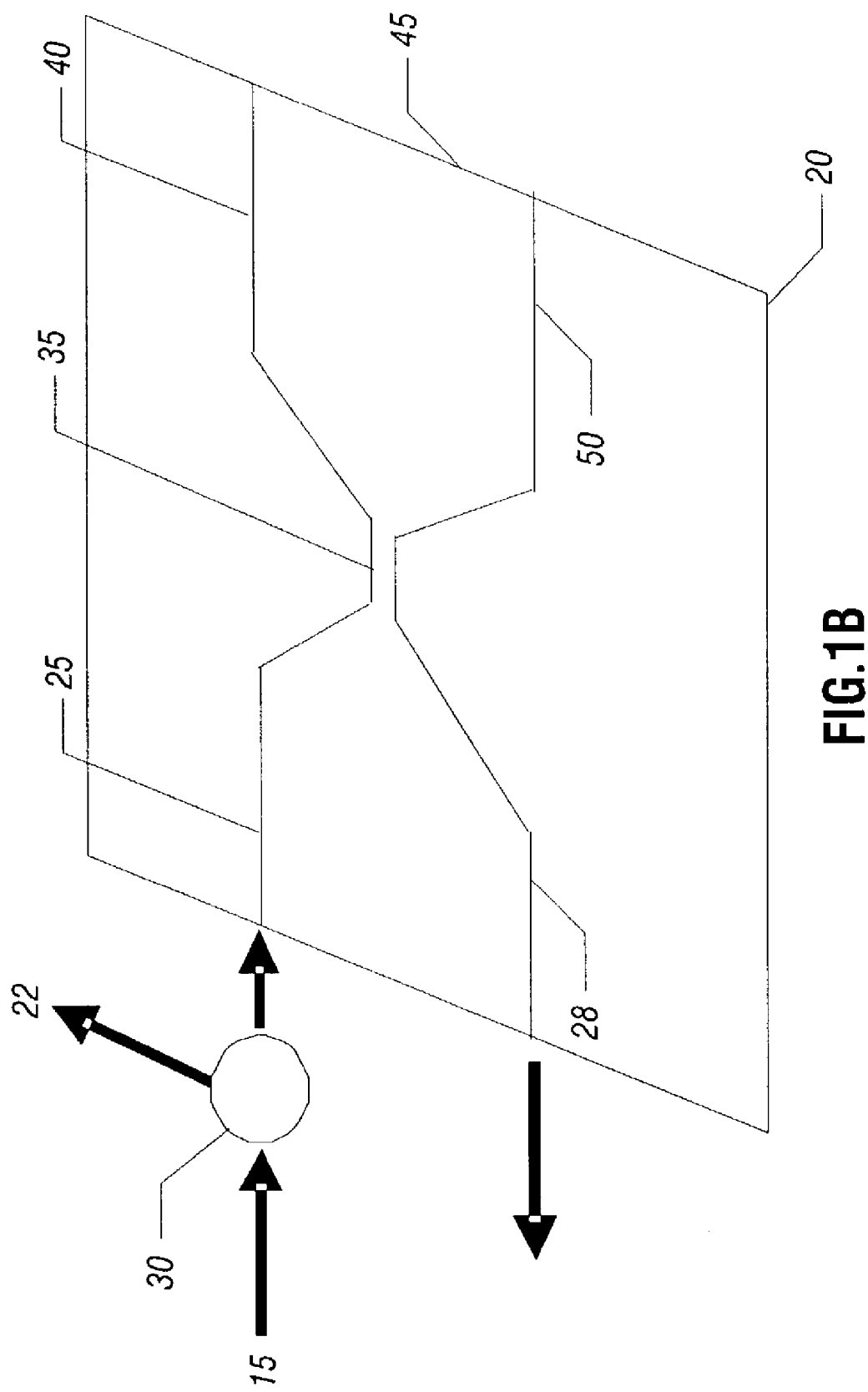
FIG. 1B is a schematic diagram of a planar integrated optical device in accordance with a second embodiment of the present invention.

In yet other embodiments, a device in accordance with the present invention may be formed using a Michelson type interferometer configuration. Referring now to FIG. 1B, shown is a schematic diagram of a device in accordance with a second embodiment of the present invention based on a Michelson type interferometer configuration. The use of the same reference numerals as in FIG. 1A indicate similar components. As shown in FIG. 1B, incoming pulse 15 passes through a circulator 30 and into waveguide 25, and is then separated by coupler 35 and fed into NLO arm 40 and second arm 50. As discussed above, NLO arm 40 causes the portion of the optical pulse propagating therethrough to undergo self-phase modulation. The two portions of the optical pulse may be reflected by a reflective facet 45 which may be, for example, a dielectric or metallic mirrored surface. Then the two portions of the optical pulse may be recombined at coupler 35.

After such recombining, the high intensity main portion of the pulse may exit the device via waveguide 25, where it may then pass through circulator 30 and exit via an optical fiber 22, for example. While shown as a separate component in the embodiment of FIG. 1B, in other embodiments a circulator may be formed on the same substrate as a device in accordance with the present invention.

In the embodiment of FIG. 1B, the low intensity portion of the pulse may exit the device via waveguide 28. As discussed above, the low intensity portion may be unused in further processing. While discussed as a symmetric Michelson type interferometer, in other embodiments an asymmetric Michelson type interferometer may be used.

In still other embodiments, devices may be formed using optical fibers rather than waveguide structures. In such embodiments, one arm may be formed using an optical fiber doped with a NLO material. In certain embodiments, such a doped optical fiber may have a nonlinear index on the order of approximately $10^{-8}$ to $10^{-6}$ cm²/MW. In certain embodiments, the optical fibers may have a length of between approximately one meter to twenty meters.

Embodiments of the present invention may be used in optical networks accommodating multiple channels, as the device may be transparent to the number of channels, and incoming pulses need not be demultiplexed. Restoring optical pulses in accordance with embodiments of the present invention may be performed rapidly using ultrafast nonlinear optical processes, requiring only femtoseconds for operation.

In certain embodiments, the distance between a transmitter and a receiver may be increased, as a device in accordance with the present invention may desirably restore optical pulses degraded during transmission over optical links of extended lengths. More so, embodiments of the present invention may be incorporated in an optical network to reduce the need for repeaters, or to extend the length between repeaters. In certain embodiments, a receiver and transmitter may be located at extended distances of between approximately 10 km and 500 km, and degraded optical pulses may be cleaned and shaped in accordance with embodiments of the present invention.

In certain embodiments, a device in accordance with an embodiment of the present invention may be integrated in a PLC on a single substrate along with other active and passive optical components such as an arrayed waveguide grating (AWG), a variable optical attenuator (VOA), a laser source, and the like.

Referring now to FIGS. 2A–2D, shown are graphical representations of various optical pulses. FIG. 2A is a graphical representation of a typical pulse shape emitted by an optical transmitter. FIG. 2B is a graphical representation of the pulse shape of FIG. 2A after distortion by propagation in an optical fiber. FIG. 2C is a cleaned and shaped version of the optical pulse of FIG. 2A after being restored in accordance with one embodiment of the present invention. In one such embodiment, the pulse shape of FIG. 2C may be the high intensity optical pulse exiting device 10 via waveguide 60. FIG. 2D is a graphical representation of low intensity wings which exit device 10 via waveguide 70 in one embodiment of the present invention.

Figure 3:
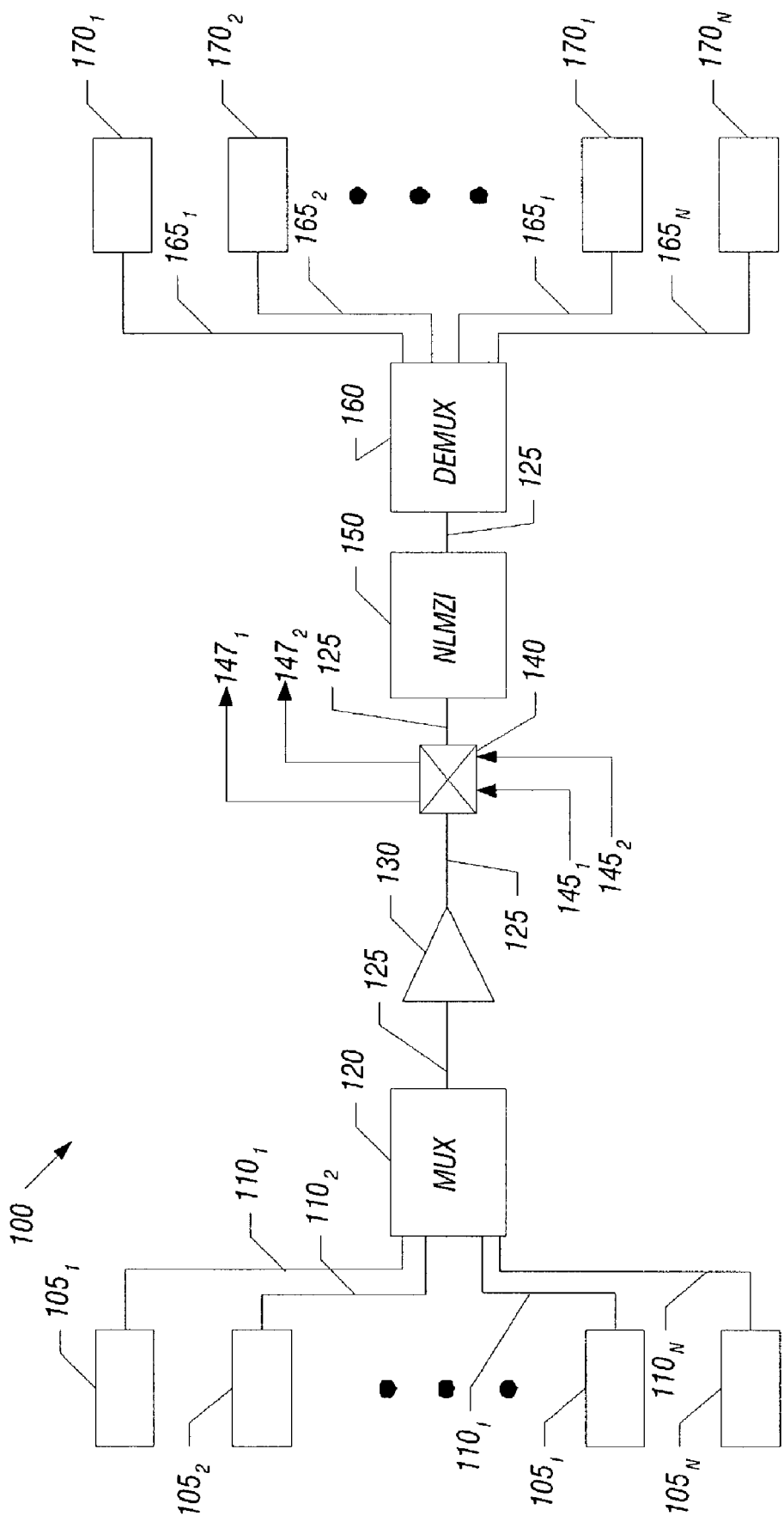
FIG. 3 is a block diagram of an optical network in accordance with one embodiment of the present invention.

Referring now to FIG. 3, shown is a block diagram of an optical network 100 in accordance with one embodiment of the present invention. As shown in FIG. 3, a plurality of lasers $105_1$-$105_n$ may be coupled to a plurality of waveguides $110_1$-$110_n$ and provide optical pulses to a multiplexer 120. Multiplexer 120 multiplexes the multiple optical pulses onto a single optical fiber 125. In one embodiment, the optical pulses may be multiplexed using wavelength division multiplexing (WDM). In such manner, a number of data channels having different wavelengths may be carried on a single optical fiber.

In one embodiment, optical fiber 125 may be coupled to an amplifier 130, which in turn may be coupled to another optical fiber 125. Optical fiber 125 may be coupled to an optical cross connect 140. Optical cross connect 140 may be used to route certain channels from the optical pulses to other desired network locations, as shown by drop ports $147_1$ and $147_2$. Further, optical cross connect 140 may be used to inject incoming optical pulses into optical network 100 via add ports $145_1$ and $145_2$.

The optical pulses may then travel on optical fiber 125, which is coupled to a nonlinear Mach-Zehnder interferometer (NLMZI) device 150 in accordance with an embodiment of the present invention. As discussed above, device 150 may be used to restore optical pulses by cleaning and shaping them such that exiting pulses are restored to a higher intensity and an undistorted shape.

In one embodiment, NLMZI device 150 may be coupled to a demultiplexer 160 which separates the optical pulses into a plurality of waveguides $165_1$-$165_n$, each corresponding to a different wavelength (in a WDM network). In turn, waveguides $165_1$-$165_n$, may be coupled to respective photodetecters $170_1$-$170_n$, which may be used to convert the optical pulses into electrical signals for further processing and use.

Figure 4:
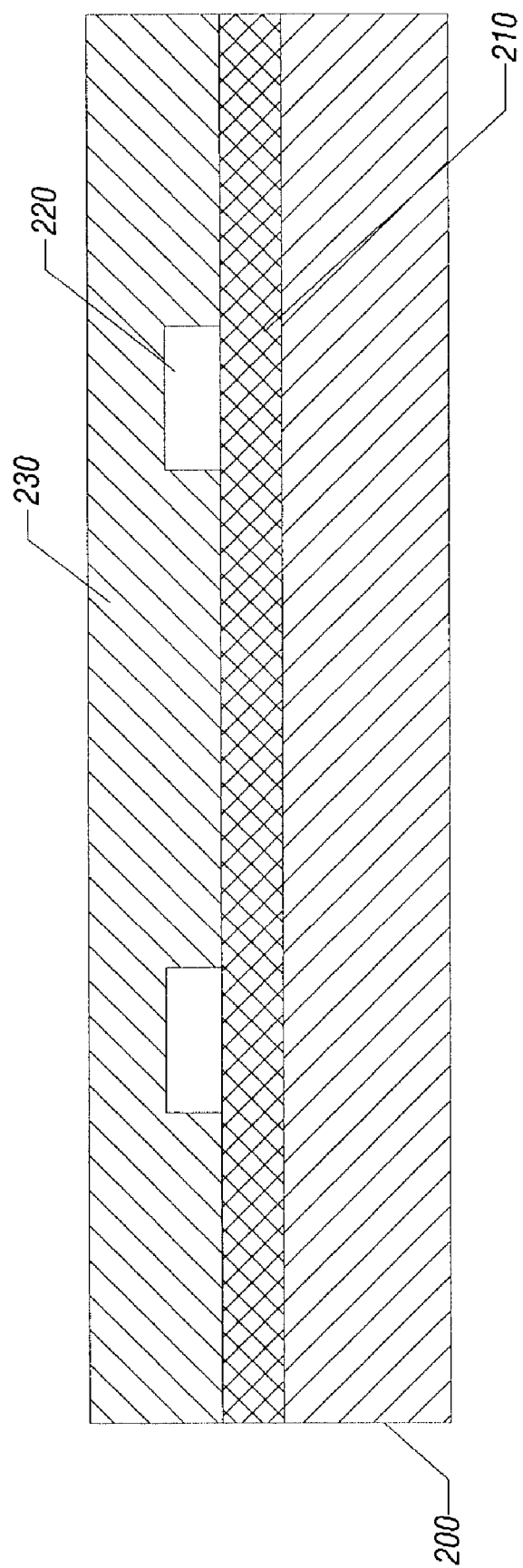
FIG. 4 is a cross-section view of a waveguide structure in accordance with one embodiment of the present invention.

As discussed above, in one embodiment, the waveguide structures may be manufactured on a silica-on-silicon platform. Referring now to FIG. 4, shown is a cross-section view of a waveguide structure in accordance with one embodiment of the present invention.

In one embodiment, the waveguide structure may be formed as follows. A first layer 210 may be formed on a substrate 200. In one embodiment, approximately a 15 micron (um) thick thermal oxide ($SiO_2$) layer may be grown on a silicon substrate. This first layer 210 may serve as the lower clad of the waveguide. Next, a core layer 220 may be formed on first layer 210. In one embodiment, the core layer 220 may be formed by a plasma-enhanced chemical vapor deposition (PECVD) process. In various embodiments, core layer 220 may be about 6 micron thick and may be germanium-doped oxide (Ge—$SiO_2$). Next, core layer 220 may be patterned to form the waveguide shape. In one embodiment, a waveguide approximately 6 micron by 6 micron may be patterned via conventional photolithography and etching processes. Then, an upper layer 230 may be deposited. In one embodiment, such an upper clad may be formed by a PECVD process, and may be approximately 15 micron thick and formed of boron-phosphorus-doped oxide (BP—$SiO_2$) material. In certain embodiments, an oxide layer (not shown in FIG. 4), such as a 1 micron thick undoped oxide, may be grown above upper layer 230 to protect it from environmental degradation.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first coupler to separate an optical pulse into a first optical pulse portion and a second optical pulse portion;
   a first optical path coupled to the first coupler to carry the first optical pulse portion, the first optical path comprising a nonlinear optical medium comprising polydiacetylene-para-toluene-sulfonate;
   a second optical path coupled to the first coupler to carry the second optical pulse portion; and
   a second coupler coupled to the first optical path and the second optical path to combine the first optical pulse portion and the second optical pulse portion.

2. The apparatus of claim 1, further comprising a first output waveguide coupled to the second coupler, wherein the first output waveguide is coupled to receive a high intensity main pulse portion of the optical pulse.

3. The apparatus of claim 1, wherein the second optical path comprises silica.

4. The apparatus of claim 2, further comprising an optical fiber coupled to the first output waveguide.

5. The apparatus of claim 4, further comprising a demultiplexer coupled to the optical fiber.

6. The apparatus of claim 1, further comprising a substrate supporting the first coupler, the first optical path, the second optical path, and the second coupler, the substrate also supporting an arrayed waveguide grating.

7. The apparatus of claim 1, further comprising a plurality of optical channels carried by an optical fiber coupled to the first coupler.

8. The apparatus of claim 1, wherein the apparatus comprises a Mach-Zehnder type interferometer.

9. The apparatus of claim 1, wherein the second optical path comprises a second nonlinear optical medium.

10. An apparatus comprising:
    a first coupler to separate an optical pulse into a first optical pulse portion and a second optical pulse portion, and to later recombine the first optical pulse portion and the second optical pulse portion;
    a first optical path coupled to the first coupler to carry the first optical pulse portion, the first optical path comprising a waveguide formed of a nonlinear optical medium; and
    a second optical path coupled to the first coupler to carry the second optical pulse portion.

11. The apparatus of claim 10, further comprising a circulator coupled to the first coupler, wherein the circulator is coupled to receive a high intensity main pulse portion of the optical pulse after recombination in the first coupler.

12. The apparatus of claim 10, wherein the second optical path comprises silica.

13. The apparatus of claim 10, further comprising a reflective facet coupled to the first optical path and the second optical path.

14. The apparatus of claim 10, wherein the nonlinear optical medium comprises polydiacetylene-para-toluene-sulfonate.

15. The apparatus of claim 11, further comprising a plurality of optical channels carried by an optical fiber coupled to the circulator.

16. The apparatus of claim 10, wherein the apparatus comprises a Michelson type interferometer.

17. An apparatus comprising:
a circulator;
a first coupler coupled to the circulator to separate an optical pulse into a first optical pulse portion and a second optical pulse portion, and to later recombine the first optical pulse portion and the second optical pulse portion;
a first optical path coupled to the first coupler to carry the first optical pulse portion, the first optical path formed of a nonlinear optical medium; and
a second optical path coupled to the first coupler to carry the second optical pulse portion.

18. The apparatus of claim 17, further comprising a reflective facet coupled to the first optical path and the second optical path.

19. The apparatus of claim 17, wherein the nonlinear optical medium comprises polydiacetylene-para-toluene-sulfonate.

20. The apparatus of claim 17, further comprising a first optical fiber coupled to provide the optical pulse to the circulator and a second optical fiber coupled to receive a high intensity portion of the optical pulse from the circulator.

21. The apparatus of claim 9, wherein the first optical path comprises a positive nonlinear optical medium and the second optical path comprises a negative nonlinear optical medium.

22. The apparatus of claim 10, wherein the first optical path comprises a third order nonlinear optical medium.

23. The apparatus of claim 10, wherein the nonlinear optical medium is to self-phase modulate the first optical pulse portion.

24. The apparatus of claim 10, wherein the nonlinear optical medium comprises a polymer.

25. An apparatus comprising:
a first coupler to separate an optical pulse into a first optical pulse portion and a second optical pulse portion;
a first optical arm coupled to the first coupler to transmit the first optical pulse portion from the first coupler to a second coupler, the first optical arm formed of a nonlinear optical medium comprising a polymer;
a second optical arm coupled to the first coupler to transmit the second optical pulse portion; and
the second coupler coupled to the first optical arm and the second optical arm to combine the first optical pulse portion and the second optical pulse portion.

26. The apparatus of claim 25, wherein the nonlinear optical medium comprises a third order nonlinear medium.

27. The apparatus of claim 25, wherein the nonlinear optical medium is to self-phase modulate the first optical pulse portion.

28. The apparatus of claim 25, wherein the second optical arm is formed of a second nonlinear optical medium.

29. The apparatus of claim 25, wherein the polymer comprises polydiactylene-para-toluene-sulfonate.

30. The apparatus of claim 10, wherein the first coupler is to spatially separate the first optical pulse portion and the second optical pulse portion without external electrical power.

* * * * *